United States Patent [19]
Brown

[11] 3,845,854
[45] Nov. 5, 1974

[54] WHEEL CONVEYOR SYSTEM

[76] Inventor: Ced F. Brown, E. Rosebud Rd., R.R. No. 5, Mt. Pleasant, Mich.

[22] Filed: Nov. 24, 1972

[21] Appl. No.: 309,608

[52] U.S. Cl. .............................. 198/184, 198/204
[51] Int. Cl. ............................................ B65g 15/00
[58] Field of Search .......... 198/1, 184; 104/155, 247

[56] References Cited
UNITED STATES PATENTS
2,181,377  11/1939  Mabie ................................ 104/247
3,687,083  8/1972  Brown ............................... 104/155

Primary Examiner—Richard E. Aegerter
Attorney, Agent, or Firm—J. King Harness

[57] ABSTRACT

A system for conveying automobiles in automatic car washers is illustrated, described and claimed in the patent to Ced F. Brown, U.S. Pat. No. 3,687,083, issued Aug. 29, 1972. The front and rear wheels on one side of the vehicle are driven in a trough by hydraulic units effective on one or the other or both of the wheels. Difficulty was experienced in tracking the wheels within the trough and this was overcome by sloping the trough bottom or by permitting the trough bottom to tilt laterally in either direction. The wheel will climb up from the slope and assume a horizontal position to track on the center line thereof and to come back to the center line each time it moves therefrom.

9 Claims, 10 Drawing Figures

PATENTED NOV 5 1974
3,845,854
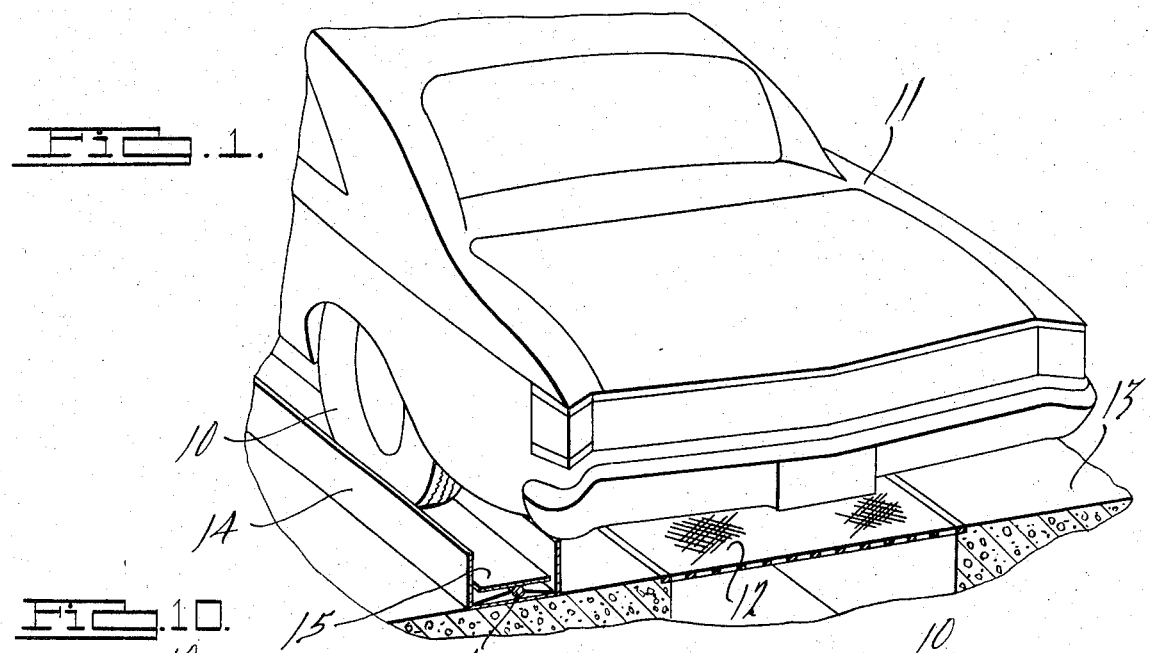
FIG. 1.
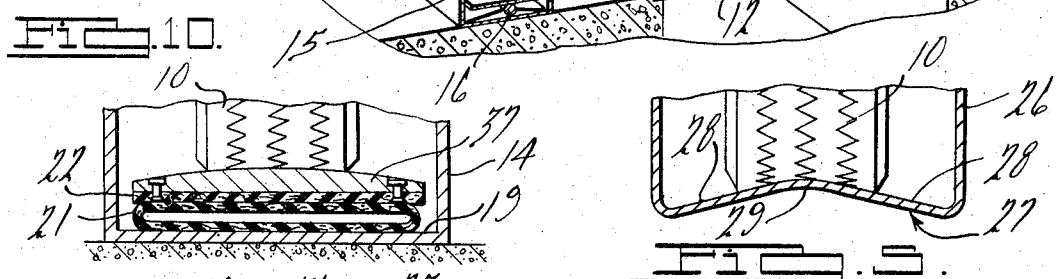
FIG. 10.
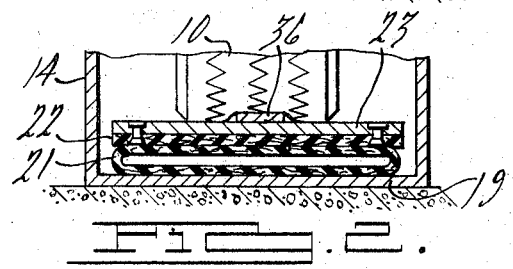
FIG. 2.
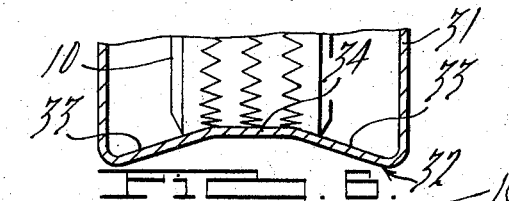
FIG. 5.
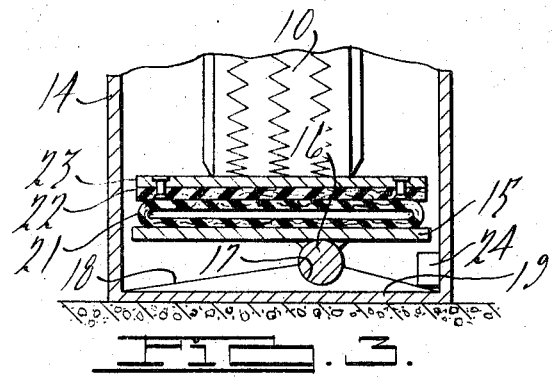
FIG. 3.
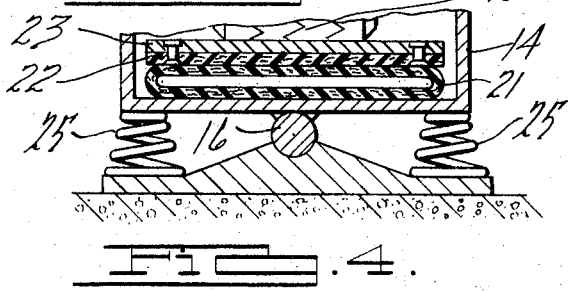
FIG. 6.
FIG. 4.
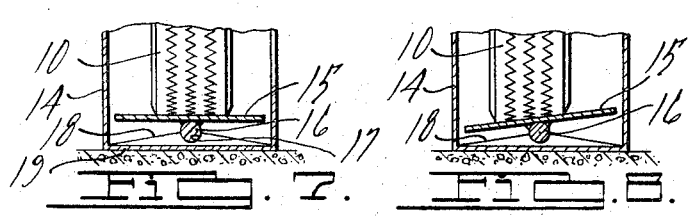
FIG. 7.  FIG. 8.
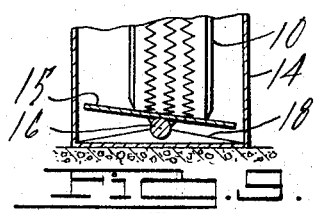
FIG. 9.

WHEEL CONVEYOR SYSTEM

BACKGROUND OF THE INVENTION

The principal utilized for having the wheel climb up the incline when the bottom slopes to maintain the wheels tracking on the center of the bottom follows that of a driven belt. The pulley wheel for the belt converges slightly from the center toward the ends and should the belt tend to move toward an end, the pressure will increase toward the edge of the belt adjacent to the center of the wheel pulley and cause the belt to climb toward the center. This will occur each time the belt tends to shift from the center in either direction to thereby cause it to track along the center of the pulley.

SUMMARY OF THE INVENTION

The invention pertains to an improvement made to the trough in which the wheels of an automobile is advanced on a belt by hydraulic means in a manner disclosed in the above mentioned patent. The bottom slopes toward the sides or a false bottom is mounted in the trough on a cylindrical rod secured to its underface to rotate in a depression in the channel in which the false bottom is supported. As the wheel tends to move from the center in either direction, the slope of the bottom will produce more pressure on the side of the tire closest to the trough center which causes it to ride up the incline and track on the center of the channel bottom. This will occur in either direction in which the bottom is positioned or is tilted which maintains the center of the tire on the center of the bottom as it may continuously move approximately half an inch each side of the center line thereof.

Springs may be provided on the sides of the false bottom to provide resistance against tilting to balance the pressure applied by the tire so that even when a slight tilting occurs, the tire will be brought back to center. The cylindrical rod may be offset from the center of the false bottom so that a greater tendency of the false bottom to tilt in one direction will occur to cause the tire to climb toward the center. In any arrangement, the advancement of the automobile by the use of hydraulic pressure within a flat tube on which a belt is disposed prevents the wheels from moving into engagement with the side of the channel in which the wheels are advanced. The tiltable bottom or one sloping both directions from the center causes the tire to climb in the direction in which greater pressure is applied to the tire edge. When properly designed, the wheel can be maintained approximately within a half inch either side of the center line of the trough.

BRIEF DESCRIPTION OF THE DRAWINGS

FIG. 1 is a broken sectional view of structure for washing an automobile with parts broken away and in section embodying features of the present invention;

FIG. 2 is a view of the trough illustrated in FIG. 1, with one form of a belt drive engaging the bottom thereof;

FIG. 3 is a view of the structure illustrated in FIG. 2 with the hydraulic propulsion means and the belt thereon which advances the automobile wheels within the trough structure;

FIG. 4 is a view of structure, similar to that illustrated in FIG. 2, showing another form of the invention;

FIG. 5 is a view of structure having a trough with a fixed bottom sloping downwardly to the bottom of the trough sides;

FIG. 6 is a view of structure, similar to that illustrated in FIG. 5, showing a horizontal section in the center of the bottom;

FIG. 7 is a view of a false bottom within the trough disposed in horizontal position, as illustrated in FIG. 1;

FIG. 8 is a view of the structure illustrated in FIG. 7 with the bottom tilted downwardly at the left side thereof;

FIG. 9 is a view of the structure illustrated in FIG. 7 with the bottom tilted downwardly at the right side thereof, and FIG. 10 is a view of structure similar to that illustrated in FIG. 2, showing another form thereof.

DESCRIPTION OF THE PREFERRED EMBODIMENTS

In FIG. 1, an automobile 11 is illustrated as being propelled along a car washing structure 12 having a platform 13 on one side and a trough 14 on the other side in which the front and the rear tires 10 track as they are advanced to move the automobile through the washing path. The trough 14, as illustrated in FIGS. 1, 7, 8 and 9, has a false bottom 15 secured to a cylindrical rod 16 which is axially oscillatable within a recess 17 in the web 18 secured to the bottom 19 of the trough. The tire 10 is shown resting on the centerline of the false bottom 15 directly above the cylindrical rod 16. When the tire tends to drift from the center position whether to the right or to the left, the false bottom will tend to tilt to thereby increase the pressures on the tire's edge adjacent to the false bottom center to thereby cause it to climb up the inclined bottom to the central position.

As illustrated in FIG. 3, a flat tube 21 rests upon the bottom 15 in which fluid is directed to advance a belt 22 with cleats 23 thereon and the tire 10 along the trough. It will be noted in this figure that the cylindrical rod 16 is shifted from the center to the right to cause the left side of the false bottom 15 to tilt downwardly when the tire 10 drifts to the left causing it to move toward the center of the false bottom which is returned to horizontal position. Should the tire shift to the right, a stop block 24 prevents the false bottom adjacent thereto from tilting downwardly beyond a desired amount which permits the tire to immediately climb toward the center position.

In FIG. 4, the channel 14 has the cylindrical rod 16 secured to the bottom thereof and the edges below the sides have a row of springs 25 provided therealong. In this arrangement, the entire channel tilts in either direction and this tilting is resisted by the springs 25 to cause the wheel to move a greater distance from the center of the bottom in order to produce sufficient tilt to have the tire climb to the center and the channel to tilt back to have its bottom in horizontal position. It is to be understood that the springs could be used along the underside of the edges of the false bottom 15 while maintaining the channel 14 in fixed position.

In FIG. 5, a channel 26 is illustrated having a fixed bottom 27 which has fixed sections 28 sloping in the opposite direction from the center 29. When the tire 10 drifts in either direction from the center 29, a pressure along the edge closest to the center will cause the tire to climb back to the central position herein illustrated.

In FIG. 6, a channel trough 31 is illustrated having a fixed bottom 32 with two edge sections 33 which slope downwardly from a horizontal central section 34. The tire 10 will travel along the central section 34 and when drifted toward either side will climb back to the central section 34 to ride therealong until it again drifts to one or the other side.

In FIG. 2, the cleats 23 on the belt 22 have a metal plate 36 secured thereto at the center thereof. The plate will cause the tire to continue to move to the center of the belt 22 when it drifts from the center thereof in either direction. The same result is produced by the belt 22 of FIG. 10 which has metal plates 37 of lateral arcuate shape at the top secured to the cleats 23.

In FIGS. 1 and 7, the tire 10 when moving along the trough 14 on the false bottom 15 is shown in central position with the false bottom 15 disposed horizontally. In FIG. 8, the tire 10 has drifted to the left and therefore has tilted the left side of the false bottom 15 downwardly causing the righthand edge of the tire to be subjected to increased pressure which causes it to climb upwardly to the right and return the bottom 15 to horizontal position as illustrated in FIG. 7. In FIG. 9, the tire 10 has drifted to the right causing the righthand portion of the false bottom 15 to move downwardly causing the lefthand side of the tire to be subjected to increased pressure which will cause it to climb up the false bottom 15 and tilt it back to horizontal position.

Only a short movement in either direction from the center of the fixed or false bottom will cause the tire to return to the central position. This prevents the tire from drifting sufficiently to engage the one or the other side of the trough in which the wheels on one side of the automobile are advanced.

I claim:

1. In a structure having a path on which the wheels of an automobile are advanced, trough means provided on one side of the path, a false bottom for said path on which the tires on one side of the automobile are advanced, means for advancing said wheels along said path, and means on the underside of the false bottom for supporting said false bottom and which permits the false bottom to tilt about a pivot point on said false bottom support means as the wheels pass thereover.

2. In a structure as recited in claim 1, wherein said false bottom has an element of arcuate shape on the bottom side on which the false bottom tilts transversely of the trough.

3. In a structure as recited in claim 2, wherein said arcuate surface is part of a cylindrical rod extending lengthwise on the underside of the false bottom to which it is secured.

4. In a structure as recited in claim 3, wherein said false bottom support means includes a recess in which said cylindrical rod is nested for rocking movement therein.

5. In a structure as recited in claim 2, wherein the edges of the false bottom has a plurality of springs secured thereto.

6. In a structure as recited in claim 3, wherein the false bottom cylindrical rod is positioned on one side of the centerline of said trough.

7. In a structure as recited in claim 6, further including stop means disposed on said one side of said centerline to limit the downward movement of said false support means.

8. In a structure as recited in claim 1, wherein said advancing means includes a hose on said false bottom, a belt on said hose which propels the wheels along the path, and spaced cleats on said belts having a lateral convex arcuate surface.

9. In a structure as recited in claim 1, wherein said advancing means includes a hose on said false bottom, a belt on said hose which propels the wheels along the path, spaced cleats on said belts having a lateral convex arcuate surface, and plates on the center of said cleats for increasing the thickness thereof at the center.

* * * * *